US008463106B2

(12) United States Patent
Ejima et al.

(10) Patent No.: US 8,463,106 B2
(45) Date of Patent: Jun. 11, 2013

(54) CONTENTS REPRODUCING DEVICE

(75) Inventors: Takayuki Ejima, Fukuoka (JP); Yoichi Nishida, Kanagawa (JP); Akihiro Miyazaki, Osaka (JP); Yasunori Sato, Osaka (JP); Masaru Ohba, Kanagawa (JP)

(73) Assignee: Panasonic Corporation, Osaka (JP)

( * ) Notice: Subject to any disclaimer, the term of this patent is extended or adjusted under 35 U.S.C. 154(b) by 1099 days.

(21) Appl. No.: 12/298,637

(22) PCT Filed: Apr. 5, 2007

(86) PCT No.: PCT/JP2007/057635
§ 371 (c)(1),
(2), (4) Date: Nov. 10, 2008

(87) PCT Pub. No.: WO2007/125737
PCT Pub. Date: Nov. 8, 2007

(65) Prior Publication Data
US 2009/0220217 A1 Sep. 3, 2009

(30) Foreign Application Priority Data
Apr. 28, 2006 (JP) ................. 2006-125505

(51) Int. Cl.
*H04N 5/92* (2006.01)
(52) U.S. Cl.
USPC .......................... 386/248; 386/239
(58) Field of Classification Search
None
See application file for complete search history.

(56) References Cited

U.S. PATENT DOCUMENTS

| 5,787,225 | A | * | 7/1998 | Honjo | 386/222 |
| 5,936,926 | A | * | 8/1999 | Yokouchi et al. | 369/47.33 |
| 2002/0180500 | A1 | * | 12/2002 | Okuda et al. | 327/158 |
| 2004/0008326 | A1 | * | 1/2004 | Koide | 353/99 |

FOREIGN PATENT DOCUMENTS

| EP | 1553587 A1 | 7/2005 |
| JP | 03-040269 A | 2/1991 |
| JP | 06-309798 A | 11/1994 |

(Continued)

OTHER PUBLICATIONS

European Search Report for application 07741071.0-1247/2015302 PCT/JP2007057635 dated May 4, 2012.

*Primary Examiner* — Huy T Nguyen
*Assistant Examiner* — Eileen Adams
(74) *Attorney, Agent, or Firm* — Pearne & Gordon LLP

(57) ABSTRACT

It is an object of the present invention to provide a contents reproducing device which can perform an intermittent operation with improved responsiveness to user request. The contents reproducing device according to the present invention includes: an input operation unit (1100), a system state managing unit (1210), a system information storing unit (1220), a contents reproduction control unit (A) (1230), a state after next candidate extracting unit (1240), a contents reproduction control determining unit (1250), and a contents reproducing unit (1300). The contents reproduction control determining unit (1250) determines whether or not a candidate related to the contents reproduction control is in the state after next candidates extracted by the state after next candidate extracting unit (1240). Therefore, the contents reproducing device according to the present invention can improve responsiveness to the user request by shortening the cycle of the intermittent operation of the contents reproducing unit (1300) when it is determined that there is a possibility that a user request related to the contents reproduction control is inputted, and by lengthening the cycle of the intermittent operation of the contents reproducing unit (1300) when it is determined that there is no possibility that a user request related to the contents reproduction control is inputted.

12 Claims, 14 Drawing Sheets

FOREIGN PATENT DOCUMENTS

| | | |
|---|---|---|
| JP | 07-141777 A | 6/1995 |
| JP | 07-161043 A | 6/1995 |
| JP | 08-124302 A | 5/1996 |
| JP | 08-137754 A | 5/1996 |
| JP | 10-149632 A | 6/1998 |
| JP | 3157342 B2 | 2/2001 |
| JP | 2002-124019 A | 4/2002 |
| JP | 2003-272302 | 9/2003 |
| JP | 2005-289640 A | 10/2005 |
| JP | 2006-133698 | 5/2006 |

* cited by examiner

FIG. 3
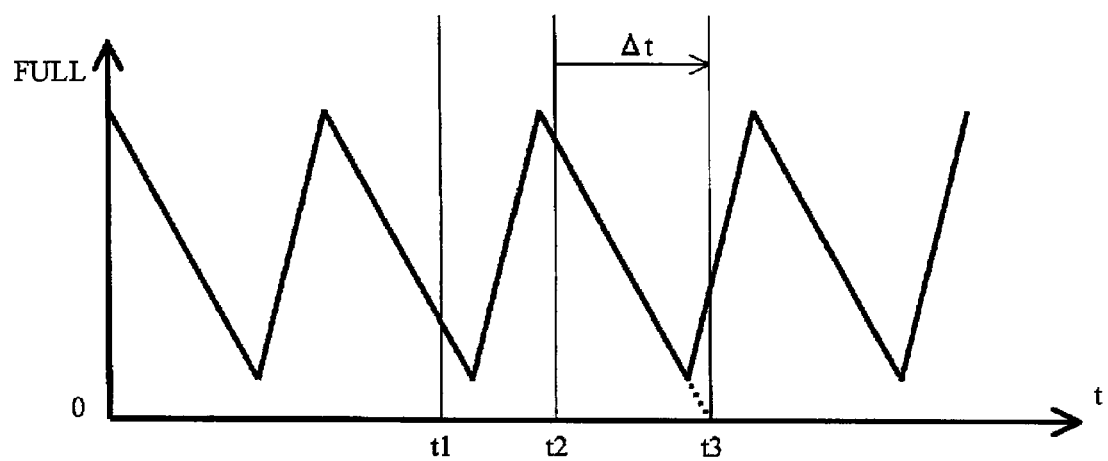
(a)
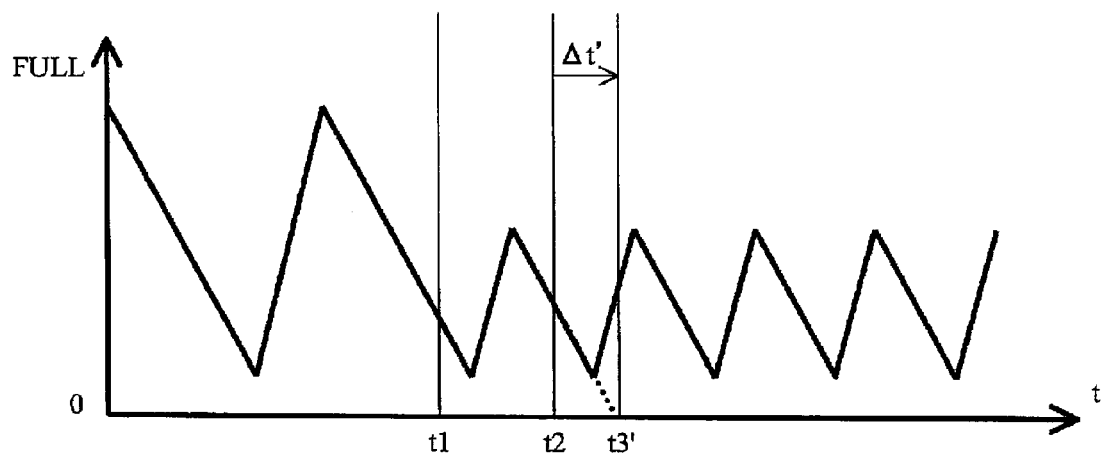
(b)

FIG. 9

1) PHONEBOOK
2) MAIL
3) AUDIO PLAYBACK —— 3-1) PLAYBACK LIST —— 3-1-1) PLAY
4) SETTINGS           3-2) VOLUME SETTING    3-1-2) FAST FORWARD
5) WEB                                       3-1-3) REWIND
                                             3-1-4) EQUALIZER SETTING
                                             3-1-5) STOP PLAY (a)

CURRENT STATE "n-1"

3-1) PLAY
3-2) VOLUME SETTING

PROCESSING A  ↓  "3-1) PLAY" IS SELECTED BY INPUT OPERATION UNIT

NEXT STATE "n"

3-1-1) PLAY
3-1-2) FAST FORWARD
3-1-3) REWIND
3-1-4) EQUALIZER SETTING
3-1-5) STOP PLAY

PROCESSING B  ↓  CANDIDATE INFORMATION OF STATE AFTER NEXT IS EXTRACTED FROM THE NEXT STATE, EXCLUDING "3-1-5) STOP PLAY".

SUMMERIZE CANDIDATE INFORMATION OF STATE AFTER NEXT "n+1"

3-1-1) PLAY
3-1-2) FAST FORWARD
3-1-3) REWIND
3-1-4) EQUALIZER SETTING (b)

FIG. 10
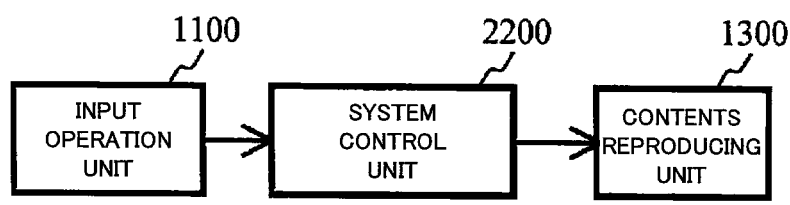
(a)
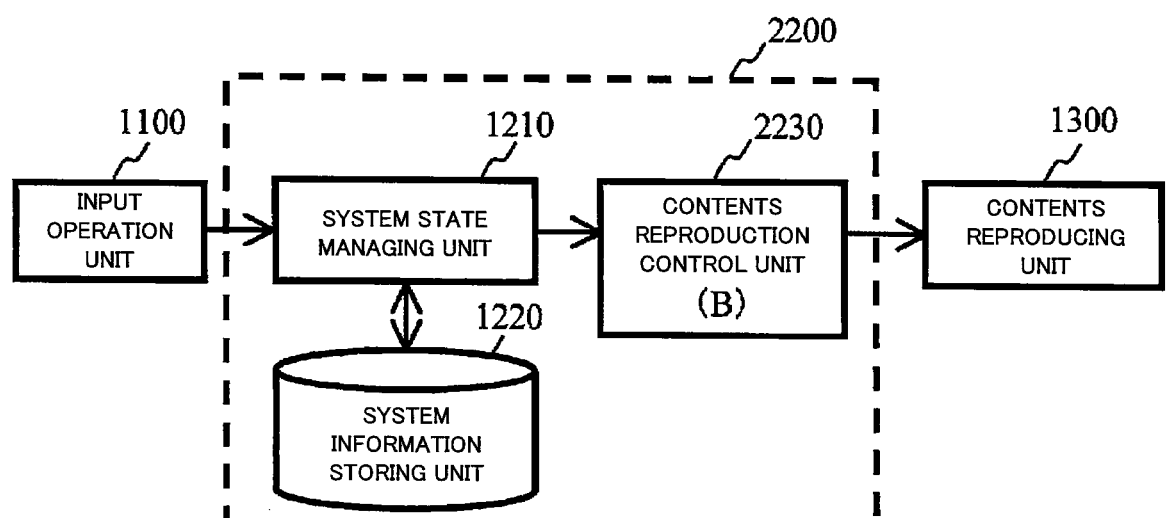
(b)

FIG. 11
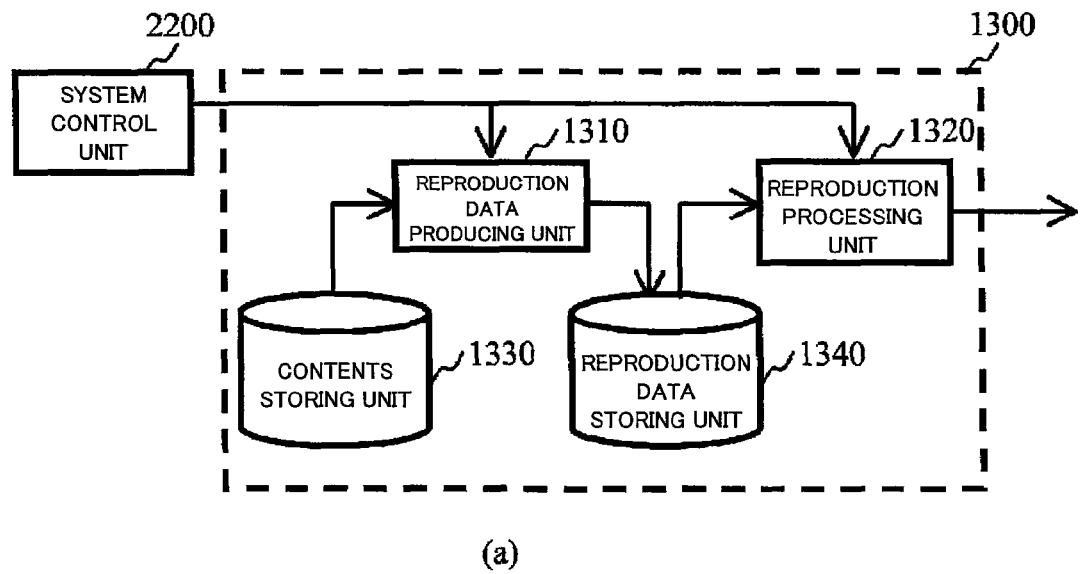
(a)
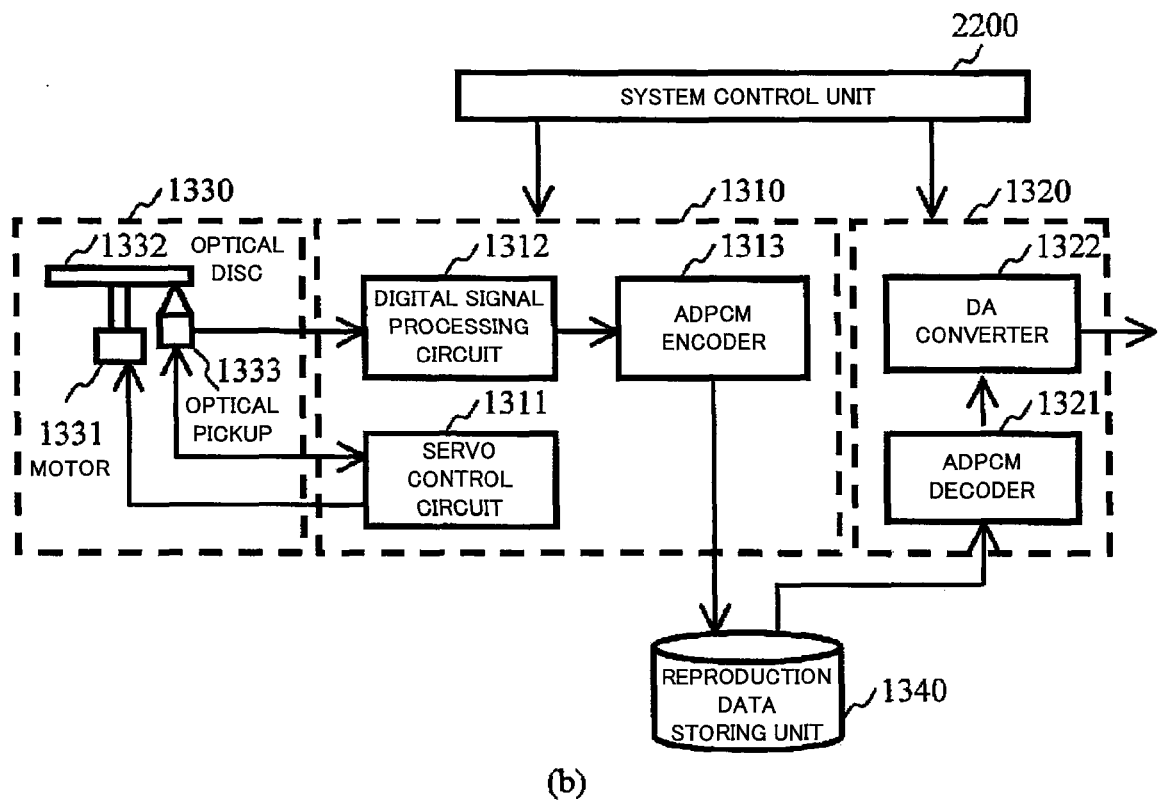
(b)

FIG. 12
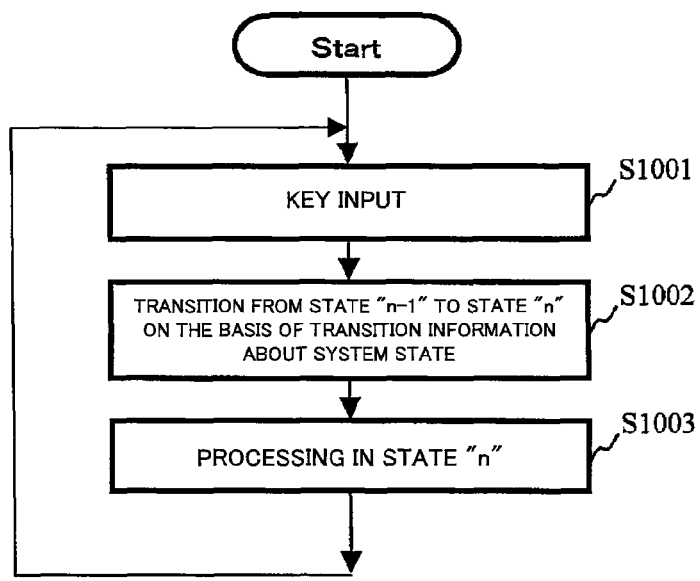
(a)
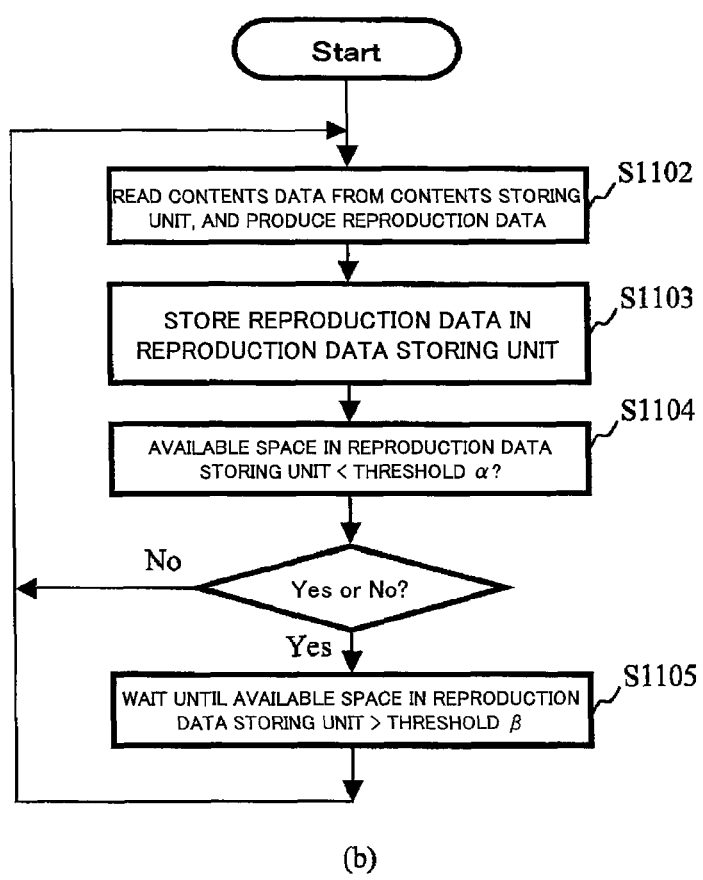
(b)

FIG. 14
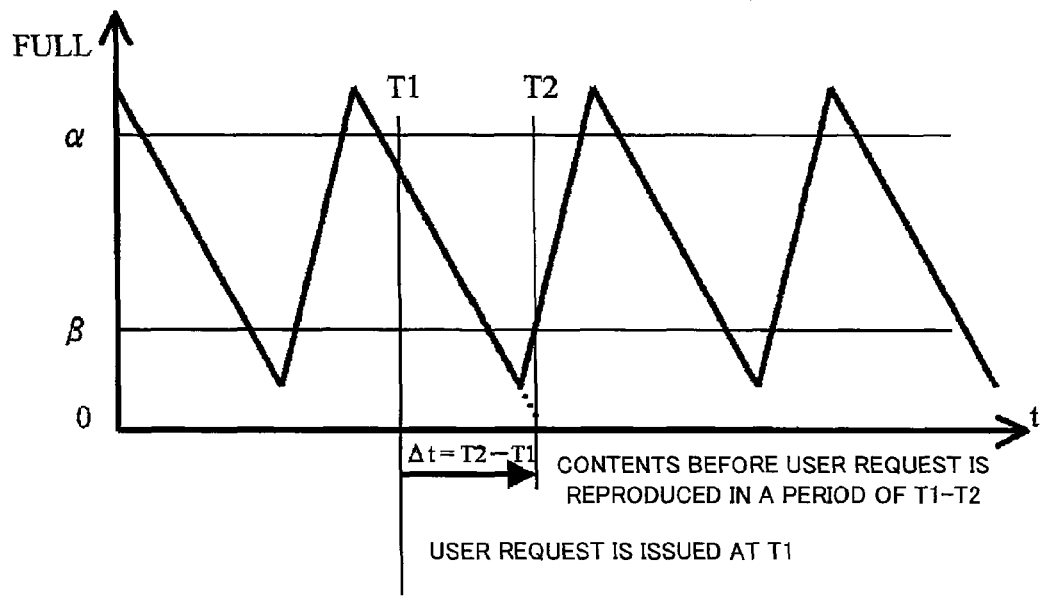
(a)
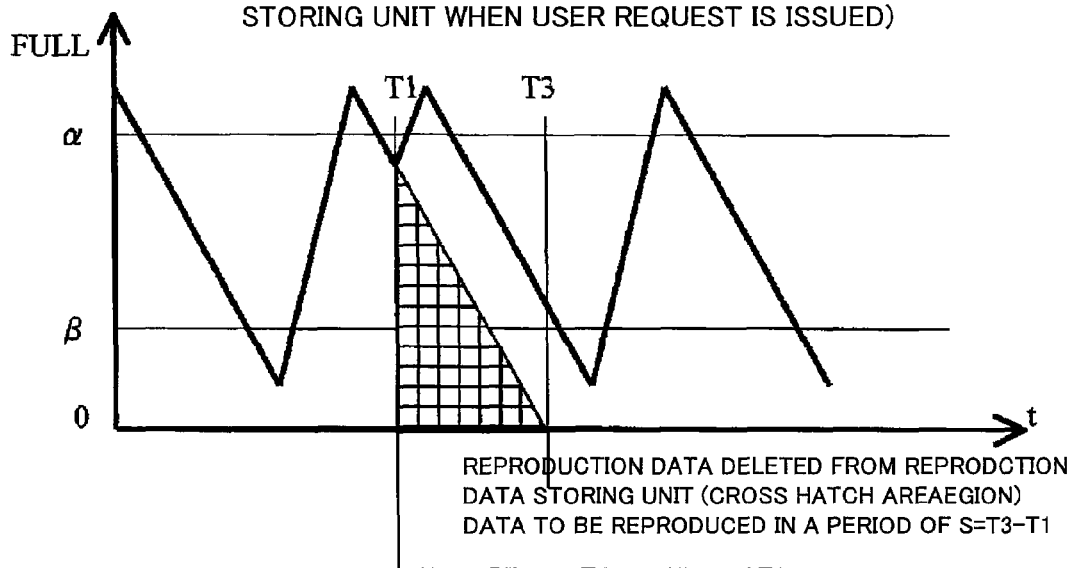
(b)

CONTENTS REPRODUCING DEVICE

FIELD OF THE INVENTION

The present invention relates to a contents reproducing device for reproducing audio and video contents, and more particularly to a contents reproducing device improved in electric power required to reproduce contents without reducing responsiveness to user request during contents reproduction, and applied to a mobile device.

BACKGROUND OF THE INVENTION

A conventionally-known contents reproducing devices is adapted to perform an intermittent reproduction control by storing reproduction data in a storing unit (see, for example, patent document 1).

FIGS. 10(a), 10(b) and 11(a) are block diagrams each showing a conventional contents reproducing device mentioned in the patent document 1. FIG. 11(b) refers to FIG. 1 in the patent document 1.

FIGS. 12(a) and 12(b) are flow charts showing an operation of the conventional contents reproducing device mentioned in the patent document 1. The operations of the conventional contents reproducing device shown in FIGS. 10(a), 10(b) and 11(a) will be described hereinafter.

FIG. 12(a) is a flow chart showing a contents reproducing operation of an input operation unit 1100 and a system control unit 2200 comprising a system state managing unit 1210, a system information storing unit 1220, and a contents reproduction control unit (B) 2230. A user request is inputted from the input operation unit 1100 (in step S1001). The system state managing unit 1210 reads current state information and system state transition information from the system information storing unit 1220. The system state managing unit 1210 makes the system state be transferred from the current state (referred to as "n−1") to the next state (referred to as "n") according to the user request (in step S1002). The contents reproduction control unit (B) 2230 controls the contents reproducing unit 1300 to perform a process (in step such as fast-forwarding) that is necessary at the next state (in step S1003).

FIG. 12(b) is a flow chart showing an operation of the contents reproducing unit 1300 including a reproduction data generating unit 1310, a contents storing unit 1330 and a reproduction data storing unit 1340, in other words, contents reproduction control unit (B) 2230 controls them. The reproduction data generating unit 1310 that received an instruction (a reproduction instruction for example) from the contents reproduction control unit (B) 2230 reads a content out from the contents storing unit 1330 and generates a reproduction data (in step S1102). The contents reproduction control unit (B) 2230 stores reproduction data generated by the contents storing unit 1330 into the reproduction data storing unit 1340 (in step S1103). The contents reproduction control unit (B) 2230 determines the amount of available memory space in the reproduction data storing unit 1340 according to a threshold α. Then, if the amount of available memory space is higher than the threshold α(determination result=NO), the process is sent back to S1102 (in step S1104). If the amount of available memory space of the reproduction data storing unit 1340 is below the threshold α(determination result=YES), the contents reproduction control unit (B) 2230 waits until the amount of available memory space in the reproduction data storing unit 1340 exceeds a threshold β (in step S1105). Though not mentioned in FIGS. 12(a) or 12(b), a reproduction data processing unit 1320 continuously performs a reproduction by constantly reading reproduction data from the reproduction data storing unit 1340.

FIG. 13 is a timing chart showing a change in the amount of reproduction data in the reproduction data storing unit 1340 of the conventional contents reproducing device, mentioned in the patent document 1, and controlled on the basis of the flow chart of FIG. 12. In particular, the vertical labels α and β on the vertical axis indicate amount data stored in the reproduction data storing unit 1340 when the amount of space available in the reproduction data storing unit 1340 reaches the thresholds α and β respectively.

FIG. 13 is a timing chart showing a change in the amount of reproduction data in the reproduction data storing unit 1340. The determination is made in determination step S1104 of FIG. 12 on whether or not the amount of reproduction data exceeds a vertical label α. On the other hand, the determination is made in determination step S1105 of FIG. 12 on whether or not the amount of reproduction data does not exceed a vertical label β.

The conventional contents reproducing device disclosed in the patent document 1 operates the reproduction generation unit 1310 at a faster pace than the reproduction data processing unit 1320, and stores reproduction data in the reproduction data storing unit 1340 prior to the reproduction by the reproduction data processing unit 1320. These operations enable the reproduction data generating unit 1310 to become inactive even during the operation of the reproduction data processing unit 1320. Moreover, the conventional contents reproducing device mentioned in the patent document 2 reduces energy consumption during its inactive stage by shutting the power supplied to the reproduction data generating unit 1310.

Patent document 1: Japanese Patent Laid-Open Publication No. H03-40269

Patent document 2: Japanese Patent Laid-Open Publication No. H07-161043

DISCLOSURE OF THE INVENTION

Problems to be Solved by the Invention

The conventional contents reproducing device however encounters a problem resulting from the fact that the reproduction data is stored in the reproduction data storing unit 1340 in advance. The problem in the conventional contents reproducing device is explained according to FIGS. 14(a) and 14(b). In FIGS. 14(a) and 14(b), the vertical labels α and β on the vertical axis indicate the amount of data stored in the reproduction data storing unit 1340 when the available memory space in the reproduction data storing unit 1340 reaches the thresholds α and β respectively.

FIG. 14(a) shows a transition over time of the amount of data stored in the reproduction data storing unit 1340 when a user request occurs at time T1. The conventional contents reproducing device faces the problem of low responsiveness to the user request due to the following reason. Namely, the reproduction data stored in the reproduction data storing unit 1340 up to time T1 is consumed up to time T2 and the system must play the contents that do not correspond to the user request until time T2.

Moreover, FIG. 14(b) differs from FIG. 14(a) in that FIG. 14(b) shows a transition over time of the amount of data stored if the content that does not correspond to the user request is first deleted, and subsequently, the content that does correspond to the user request is loaded into the reproduction data storing unit 1340. In this case, a conventional contents reproducing device has a disadvantage of wasting the power that is required to generate the reproduction data planned to be played from the time T1 to the time T3.

It is therefore an object of the present invention to provide a contents reproducing device which can reduce an electric power required to reproduce contents without reducing responsiveness to user request.

Means to Solve the Problem

In order to solve the above problems, a contents reproducing device according to the present invention comprises: a reproduction data generating unit operable to generate reproduction data to be reproduced as contents; a reproduction data storing unit in which the reproduction data generated by the reproduction data generating unit is stored; and a reproduction data processing unit operable to read the reproduction data from the reproduction data storing unit in real time, and to reproduce the reproduction data read from the reproduction data storing unit, wherein the contents reproducing device further comprises: a reproduction data generation control unit operable to control the reproduction data generating unit to have the reproduction data generating unit perform an intermittent operation by generating the reproduction data at a rate faster than a rate at which the reproduction data is read from the reproduction data storing unit; an input operation unit to be operated to have the contents reproducing device transit from one state to another state; and a system state determining unit operable to determine whether or not there is a possibility that a reproducing state of the reproduction data processing unit is changed, the reproduction data generation control unit changes a cycle of the intermittent operation, on the basis of the determination made by the system state determining unit, when the reproduction data processing unit is reproducing the reproduction data.

Advantageous Effect of the Invention

The contents reproducing device according to the present invention can reduce an electric power required to reproduce contents without reducing responsiveness to user request.

BRIEF DESCRIPTION OF THE DRAWING

FIG. 3 is a timing diagram showing a change in the amount of data stored in the reproduction data storing unit of the contents reproducing device according to the first embodiment of the present invention. FIG. 3(a) is a timing diagram showing a change in the amount of data which is in the reproduction data storing unit of the contents reproducing device according to the first embodiment of the present invention under the condition that the cycle of the intermittent operation is not changed. FIG. 3(b) is a timing diagram showing a change in the amount of data which is in the reproduction data storing unit under the condition that the cycle of the intermittent operation is changed.

FIG. 9 is a schematic view showing a hierarchically-structured menu of the contents reproducing device according to the second embodiment of the present invention. FIG. 9(a) is a schematic view showing a hierarchically-structured menu of the contents reproducing device. FIG. 9(b) is a schematic view for explaining an operation necessary to extract candidate information corresponding to a state after next "n+1".

FIG. 10 is a block diagram showing a conventional contents reproducing device. FIG. 10(a) is a general block diagram showing the conventional contents reproducing device. FIG. 10(b) is a detailed block diagram showing the system control unit of the conventional contents reproducing device.

FIG. 11 is a block diagram showing the conventional contents reproducing device. FIG. 11(a) is a detailed block diagram showing a contents reproducing unit of the conventional contents reproducing device. FIG. 11(b) is a detailed block diagram showing the contents storing unit, the reproduction data control unit, and the reproduction data processing unit of the conventional contents reproducing device.

FIG. 12 is a control flow chart showing the conventional contents reproducing device. FIG. 12(a) is a control flow chart showing operations of an input operation unit and a system control unit comprising a system state managing unit, a system information storing unit, and a contents reproduction control unit. FIG. 12(b) is a control flow chart showing an operation of a reproduction data generating unit, a contents storing unit, and a reproduction data storing unit, each of which forms part of a contents reproducing unit of the conventional contents reproducing device.

FIG. 14 is a second timing diagram showing a change in the amount of data in the reproduction data storing unit of the conventional contents reproducing device. FIG. 14(a) is a timing diagram showing a change in the amount of data in the reproduction data storing unit under the condition that the reproduction data is not deleted from the reproduction data storing unit in response to a user request. FIG. 14(b) is a timing diagram showing a change in the amount of data in the reproduction data storing unit under the condition that the reproduction data is deleted from the reproduction data storing unit in response to a user request.

BRIEF DESCRIPTION OF THE REFERENCE NUMERALS

Figure 1:
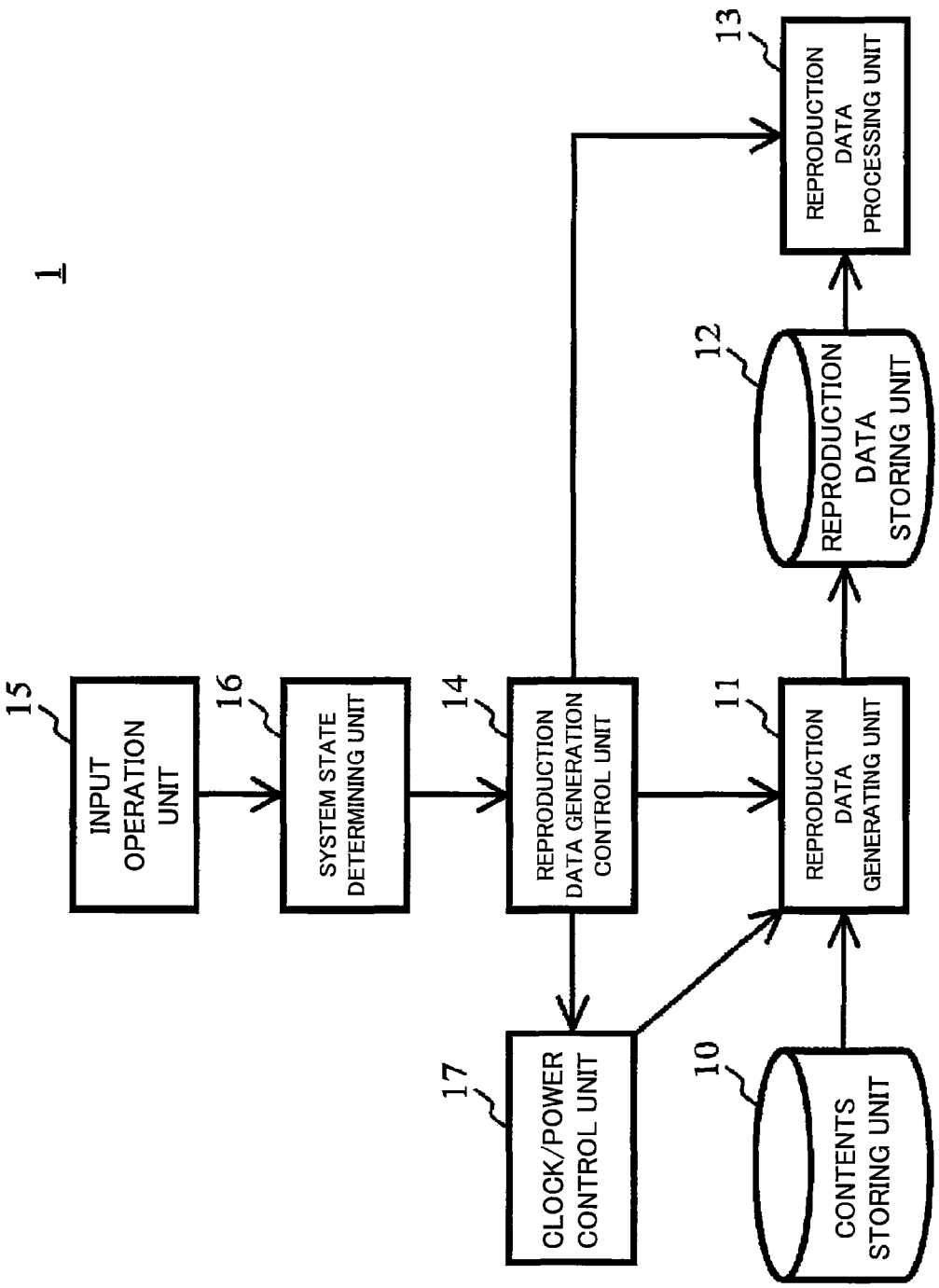
FIG. 1 is a block diagram showing the construction of the contents reproducing device according to the first embodiment of the present invention.

1: contents reproducing device
10, 1330: contents storing unit
11, 1310: reproduction data generating unit
12, 1340: reproduction data storing unit
13, 1320: reproduction data processing unit
14: reproduction data generation control unit
15, 1100: input operation unit
16: system state determining unit
17: clock/power source control unit 1200: system control unit having user prediction function
1205: system state control unit
1210: system state managing unit
1220: system information storing unit
1230: contents reproduction control unit (A)
1240: state after next candidate extracting unit
1250: contents reproduction control determining unit
1300: contents reproducing unit
1311: servo control circuit
1312: digital signal processing circuit
1313: ADPCM encoder
1321: ADPCM decoder
1322: DA transformer
1331: motor
1332: optical disc
1333: optical pickup
2200: system control unit
2230: contents reproduction control unit (B)

PREFERRED EMBODIMENTS OF THE INVENTION

Embodiments of the contents reproducing device according to the present invention will now be described with reference to accompanying drawings.

First Embodiment

FIG. 1 is a block diagram showing the contents reproducing device according to the first embodiment of the present invention.

As shown in FIG. 1, the contents reproducing device 1 comprises a contents storing unit 10 in which contents data is stored, a reproduction data generating unit 11 operable to generate, from the contents data stored in the contents storing unit 10, reproduction data to be reproduced as contents, a reproduction data storing unit 12 in which the reproduction data generated by the reproduction data generating unit 11 is stored, a reproduction data processing unit 13 operable to read the reproduction data from the reproduction data storing unit 12 in real time, and to reproduce the reproduction data read from the reproduction data storing unit 12, a reproduction data generation control unit 14 operable to control the reproduction data generating unit 11 to have the reproduction data generating unit 11 perform an intermittent operation by generating the reproduction data at a rate faster than a rate at which the reproduction data is read from the reproduction data storing unit 12, an input operation unit 15 to be operated to have the contents reproducing device 1 transit from one state to another state, and a system state determining unit 16 operable to determine whether or not there is a possibility that a reproducing state of the reproduction data processing unit 13 is changed when the input operation unit 15 is operated by a user, and a clock/power source control unit 17 operable to limit an operation of a clock circuit and/or a power source, which are provided to the reproduction data generating unit 11 and the like, when the reproduction data processing unit 13 is in an inactive stage of the intermittent operation.

In the following description, a term "predictive state" is intended to indicate a state in which there is a possibility that the reproducing state of the reproduction data processing unit 13 is changed when the input operation unit 15 is operated by the user. On the other hand, a term "stable state" is intended to indicate a state in which there is no possibility that the reproducing state of the reproduction data processing unit 13 is changed when the input operation unit 15 is operated by the user.

The contents storing unit 10 is constituted by a memory card, a magnetic disc, an optical disc, or the like having contents data. Alternatively, the contents storing unit 10 may be constituted by a buffer operable to buffer the contents data received from a server or the like through a network module (not shown).

The reproduction data generating unit 11 is constituted by a signal processor such as a digital signal processor (DSP). The reproduction data generating unit 11 processes the contents data obtained from the contents storing unit 10, and stores the reproduction data in the reproduction data storing unit 12.

Alternatively, the reproduction data generating unit 11 is not limited to a signal processor such DSP. The reproduction data generating unit 11 may be constituted by a hardware circuit, or a signal processor together with a hardware circuit.

Here, the contents data is exemplified by, for example, sounds compressed in a format such as MPEG-1 audio layer 3 (MP3), advanced audio coding (AAC) or windows media audio (WMA), or not compressed data format such as pulse code modulation (PCM).

When the contents data is exemplified by sounds, the reproduction data generating unit 11 performs signal processing such as decoding of compressed data, and sound quality converting processing such as equalizing or the like.

In this embodiment, the contents data is exemplified by sounds. The reproduction data generating unit 11 stores the reproduction data in the reproduction data storing unit 12 in the form of a linear PCM format obtained by applying a signal processing to the contents data.

The reproduction data storing unit 12 is constituted by a memory device. The reproduction data is read from or stored in the memory device on the basis of a first-in first-out (FIFO) method.

The reproduction data processing unit 13 converts the reproduction data read in real time from the reproduction data storing unit 12 into an analog signal, and outputs it to an audio output device such as a speaker (not shown).

The reproduction data generation control unit 14 is constituted by a processor such as a central processing unit (CPU) operable to control each unit of the contents reproducing device 1, and instructs to the reproduction data processing unit 13 to start to generate reproduction data, or to stop generating the reproduction data.

In particular, the reproduction data generation control unit 14 controls the reproduction data generating unit 11 to ensure that the reproduction data generating unit 11 performs an intermittent operation to generate the reproduction data at a rate faster than a rate at which the reproduction data is read from the reproduction data storing unit in real time.

More specifically, the reproduction data generation control unit 14 has a timer, instructs an amount of reproduction data to be generated by the reproduction data generating unit 11, and receives a notice of completion of generation of reproduction data from the reproduction data generating unit 11. Next, it measures, using a timer, a period of time during which the reproduction data processing unit 13 reads the reproduction data from the reproduction data storing unit 12, at a rate the same as a rate at which the contents is reproduced in real time from the reproduction data, without running out of the reproduction data stored in reproduction data storing unit 12. Finally, it again instructs an amount of reproduction data to be generated by the reproduction data generating unit 11. Consequently, the above instructions enables the reproduction data generating unit 11 to perform an intermittent operation by switching back and forth between an active state in which the reproduction data is generated, and an inactive state in which the reproduction data is not generated.

Alternatively, the reproduction data generation control unit 14 may measure, by using a timer, a start time and an end time necessary to perform the intermittent operation, and issue, at just the right time, an instruction to the reproduction data generating unit 11 to perform the intermittent operation.

The contents reproducing device 1 may further comprise a reproduction data observing unit (not shown) operable to observe the amount of reproduction data in the reproduction data storing unit 12. In this case, the reproduction data generation control unit 14 has the reproduction data generating unit 11 perform the intermittent operation by control the reproduction data generating unit 11 in response to an interrupt signal from the reproduction data observing unit when the amount of reproduction data in the reproduction data storing unit 12 exceeds a predetermined threshold, or falls below a predetermined threshold.

The input operation unit 15 is constituted by a keyboard device (not shown) and a pointing device (not shown), each of which may be operated to have the contents reproducing device 1 transit from one state to another state. In addition, the contents reproducing device 1 may be applied to a foldable or a slidable mobile terminal or the like having an open and a closed state. In this case, the input operation unit 15 may have a sensor operable to detect whether the mobile terminal is in an open or a closed state.

The system state determining unit 16 and the reproduction data generation control unit 14 are collectively constituted by a processor. The system state determining unit 16 determines, for example, that the contents reproducing device 1 is in the predictive state when a display device (not shown) constituted as a user interface displays at least one command. When the command is selected, the state of the reproduction data processing unit 13 is changed in response to the command. Conversely, the contents reproducing device 1 is in the stable state when the display device does not display any selectable commands for changing the state of the reproduction data processing unit 13.

Here, a command to change or modify the reproducing state of the reproduction data processing unit 13 may be constituted by a command such as skipping, fast-forwarding, rewinding, sound quality converting, output channel switching, a reproduction request for other reproduction data, or/and the like.

Additionally, the input operation unit 15 may be constituted by a sensor operable to detect whether a mobile terminal is in an open state or in a closed state. In this case, the system state determining unit 16 may determine that the contents reproducing device 1 is in the predictive state when the sensor detects that the mobile terminal is in the open state. On the other hand, the system state determining unit 16 may determine that the contents reproducing device 1 is in the stable state when the sensor detects that the mobile terminal is in the closed state.

Here, the reproduction data generation control unit 14 changes a cycle at which the reproduction data processing unit 13 performs the intermittent operation, on the basis of the determination made by the system state determining unit 16, when the reproduction data processing unit 13 is reproducing the contents from the reproduction data.

More specifically, the reproduction data generation control unit 14 controls the reproduction data generating unit 11 to shorten the cycle of the intermittent operation when the contents reproducing device 1 is in the predictive state, to ensure that the cycle of the intermittent operation in the predictive state is smaller than that of the intermittent operation in the stable state.

Even more specifically, the reproduction data generation control unit 14 controls the reproduction data generating unit 11 to ensure that the amount of reproduction data to be generated by the reproduction data generating unit in the predictive state is smaller than the amount of reproduction data to be generated by the reproduction data generating unit in the stable state.

As an example, the sampling frequency of the reproduction data generated by the reproduction data generating unit 11 may be 48 kHz. In this case, the reproduction data generation control unit 14 controls the reproduction data generating unit 11 to have the reproduction data generating unit 11 generate reproduction data equal to 48 frames in the stable state, and to have the reproduction data generating unit 11 generate reproduction data equal to 24 frames in the predictive state.

In this case, the cycle of the intermittent operation to be performed by the reproduction data generating unit 11 is 1 [cycle/second] when the contents reproducing device 1 is in the stable state. On the other hand, the cycle of the intermittent operation to be performed by the reproduction data generating unit 11 is 0.5 [cycle/second] when the contents reproducing device 1 is in the predictive state.

Further, when the reproduction data generation control unit 14 measures each of timings using a timer when it sends an instruction to the reproduction data generating unit 11, a period of time over which the reproduction data generating unit 11 generates the reproduction data when the contents reproducing device 1 is in the predictive state is set shorter than that when it is in the stable state.

Further, it is preferable that the reproduction data generation control unit 14 prevent the cycle of the intermittent operation of the reproduction data generating unit 11 from being changed too frequently by the following step. Namely, when the contents reproducing device 1 changes from the predictive state to the stable state by the input operation with the input operation unit 15, the reproduction data generation control unit 14 controls the reproduction data generating unit 11 so that its intermittent operation is lengthened only after a certain amount of time, during which the contents reproducing device 1 is in the stable state, has passed.

When the reproduction data generating unit 11 is in an inactive state, the clock/power source control unit 17 reduces power consumption of the contents reproducing device 1 by limiting either or both a clock signal and an electric power, which are provided to the reproduction data generating unit 11. Further, the clock/power source control unit 17 removes the above limited operation when it receives a control signal from the reproduction data generation control unit 14 which occurs before instructing the amount of the reproduction data that the reproduction data generating unit 11 generates.

As a method of limiting a clock signal to be supplied to the reproduction data generating unit 11, the clock/power source control unit 17 is adapted to shut off the clock signal, to reduce the frequency of the clock signal, or to reduce the voltage of the clock signal by controlling a clock signal generating circuit (not shown) generating the clock signal to be supplied to the reproduction data generating unit 11.

Further, as a method of limiting an electric power to be supplied to the reproduction data generating unit 11, the clock/power source control unit 17 is adapted to shut off the power circuit, or to reduce the output voltage by controlling a power circuit (not shown) supplying the electric power to the clock/power source control unit 17.

Alternatively, when the reproduction data generating unit 11 is in an inactive state, the clock/power source control unit 17 may limit a clock signal and/or an electric power, which are provided to the reproduction data generation control unit 14 excluding a timer.

Further, the contents reproducing device 1 may have reproduction data observing unit operable to generate an output signal to be outputted to the clock/power source control unit 17 when the reproduction data generating unit 11 is in an inactive state. In this case, the clock/power source control unit 17 may limit a clock signal and/or an electric power, which are provided to the reproduction data generation control unit 14 excluding a section for receiving an interrupt signal from the reproduction data observing unit.

Figure 2:
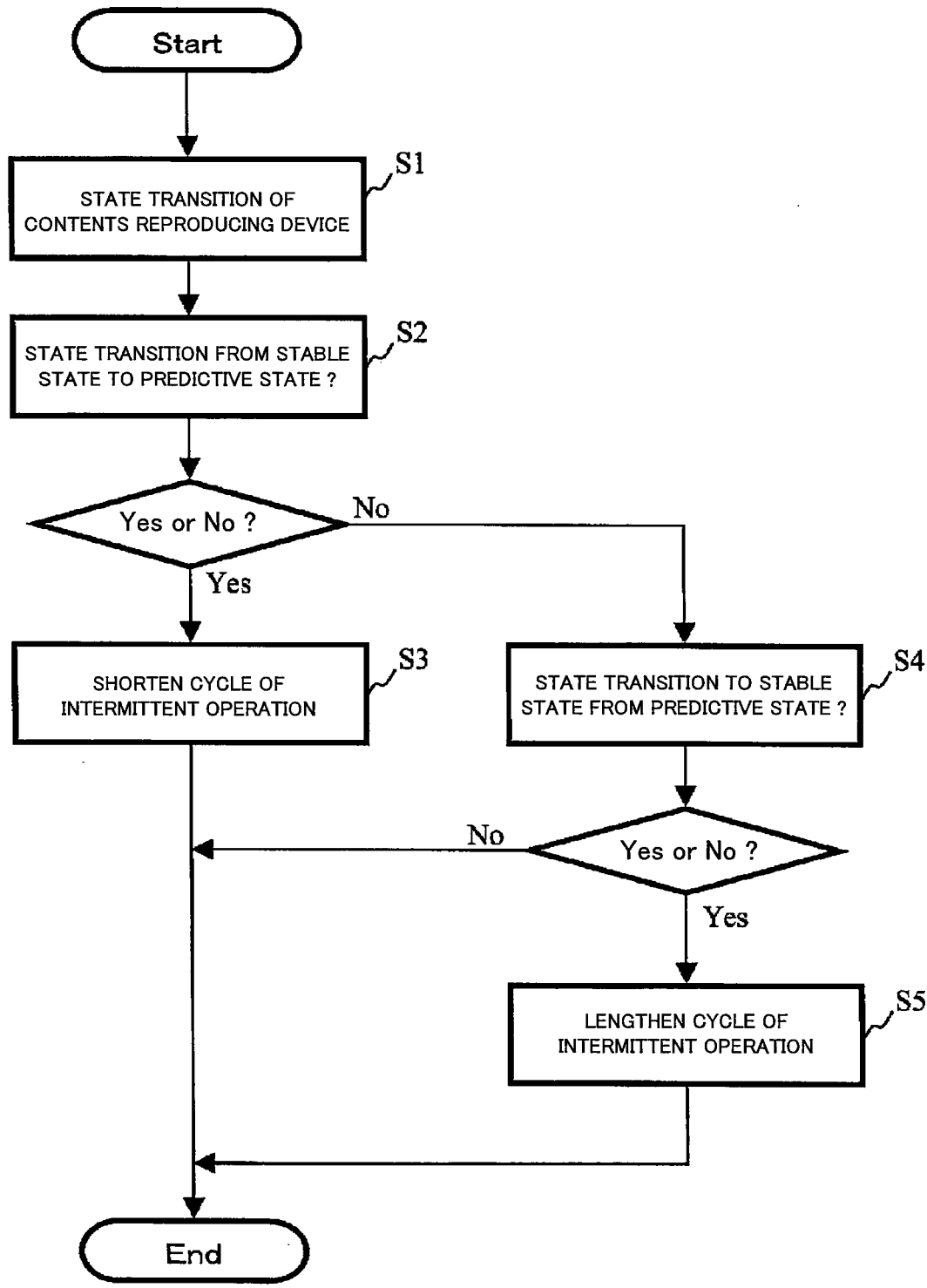
FIG. 2 is a flow chart showing the contents reproducing device according to the first embodiment of the present invention.

The operation of the contents reproducing device 1 thus constructed will then be described hereinafter with reference to FIG. 2. FIG. 2 is a flow chart showing the operation to be performed by the contents reproducing device 1 when the input operation unit 15 is operated under the condition that the reproduction data processing unit 13 is reproducing the reproduction data, and the reproduction data generating unit 11 is performing the intermittent operation.

When the user operates the input operation unit 15, the state of the contents reproducing device 1 is changed (in step S1). The system state determining unit 16 determines whether or not the state of the contents reproducing device 1 is changed from the stable state to the predictive state (in step S2).

When it is determined that the state of the contents reproducing device 1 has changed from the stable state to the predictive state, the reproduction data generation control unit 14 controls the reproduction data generating unit 11 to shorten the cycle of the intermittent operation (in step S3).

When, on the other hand, it is determined that the state of the contents reproducing device 1 has not changed from the stable state to the predictive state, the system state determining unit 16 determines whether or not the state of the contents reproducing device 1 has changed from the predictive state to the stable state (in step S4).

When it is determined that the state of the contents reproducing device 1 has changed from the predictive state to the stable state, the reproduction data generation control unit 14 controls the reproduction data generating unit 11 to lengthen the cycle of the intermittent operation (in step S5).

FIG. 3(*a*) is a timing chart showing the change of the amount of reproduction data in the reproduction data storing unit 12 under the condition that the cycle of the intermittent operation is not changed. FIG. 3(*b*) is a timing chart showing the change of the amount of reproduction data in the reproduction data storing unit 12 under the condition that the cycle of the intermittent operation is changed.

In FIGS. 3(*a*) and 3(*b*), the state of the contents reproducing device 1 is changed from the stable state to the predictive state at time t1. The input operation unit 15 is operated to change the state of the reproduction data processing unit 13 at time t2.

As shown in FIG. 3(*a*), when the cycle of the intermittent operation is not changed, the reproduction data reflected by the change of the reproduction state of the reproduction data processing unit 13 is outputted at time t3. Therefore, the time taken to respond to the user's request is $\Delta t$.

On the other hand, as shown in FIG. 3(*b*), when the cycle of the intermittent operation is changed, the reproduction data reflected by the change of the reproduction state of the reproduction data processing unit 13 is outputted at time t3' which is earlier than t3. Therefore, the time taken to respond to the user's request is $\Delta t'$ which is shorter than $\Delta t$.

The contents reproducing device according to the present invention can reduce an electric power required to reproduce contents without reducing responsiveness to user request by taking the following steps. Namely, the cycle of the intermittent operation of the reproduction data generating unit 11 is shortened when the contents reproducing device 1 is in the predictive state. Consequently, the contents reproducing device 1 of the first embodiment can shorten, on an average, the time required to output the reproduction data affected by the change of the reproducing state of the reproduction data processing unit 13.

Second Embodiment

Figure 4:
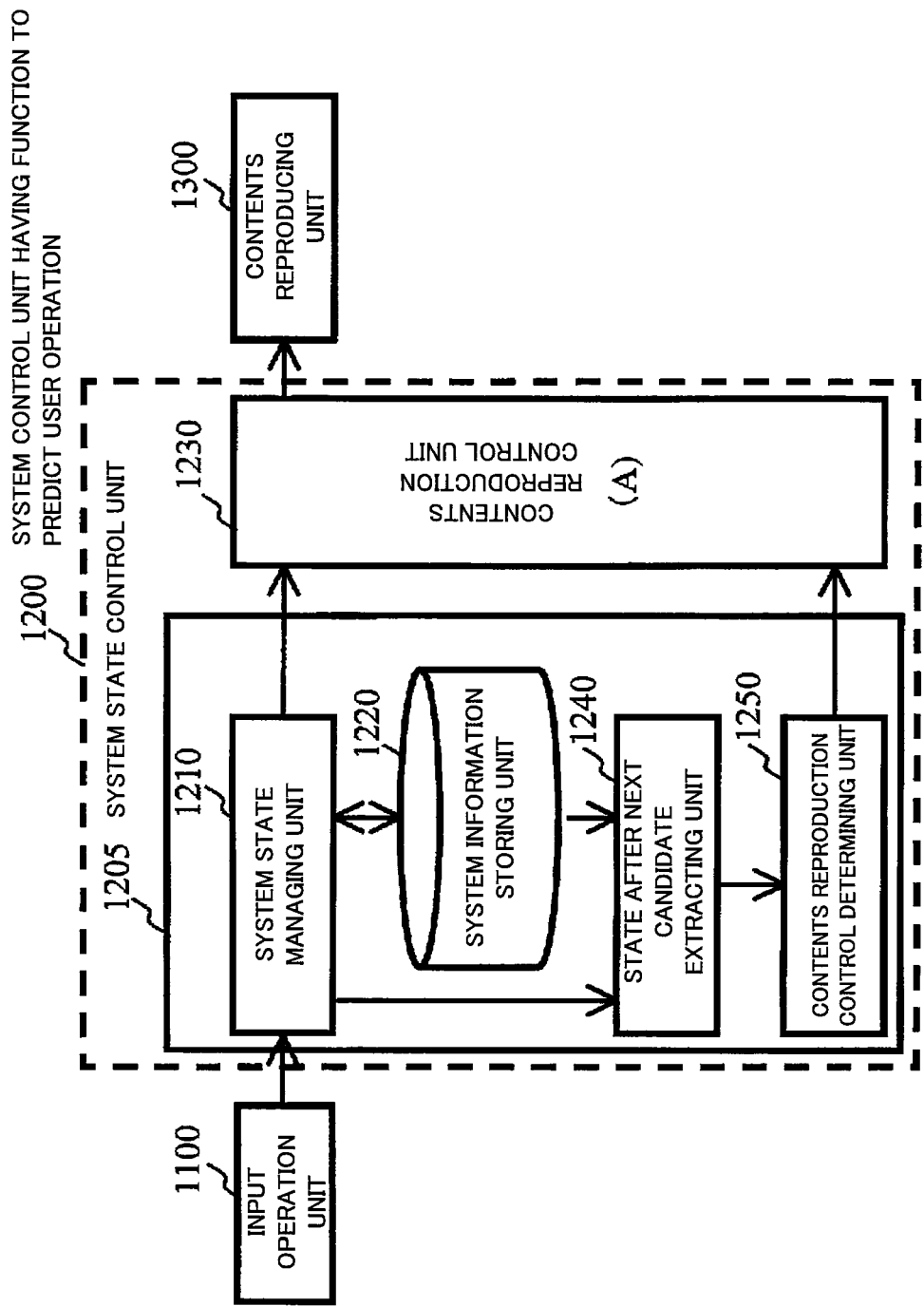
FIG. 4 is a block diagram showing the contents reproducing device according to the second embodiment of the present invention.

FIG. 4 is a block diagram showing the construction of the contents reproducing device according to the second embodiment of the present invention. As shown in FIG. 4, the same reference numerals are used for those elements that are also contained in FIGS. 10 and 11. Furthermore, in this embodiment, an input operation unit 1100, a system control unit 1205 and a contents reproduction control unit 1230 exemplary illustrate, respectively, the operation unit, the system state determining unit, and the reproduction data generation control unit of the invention.

Figure 5:
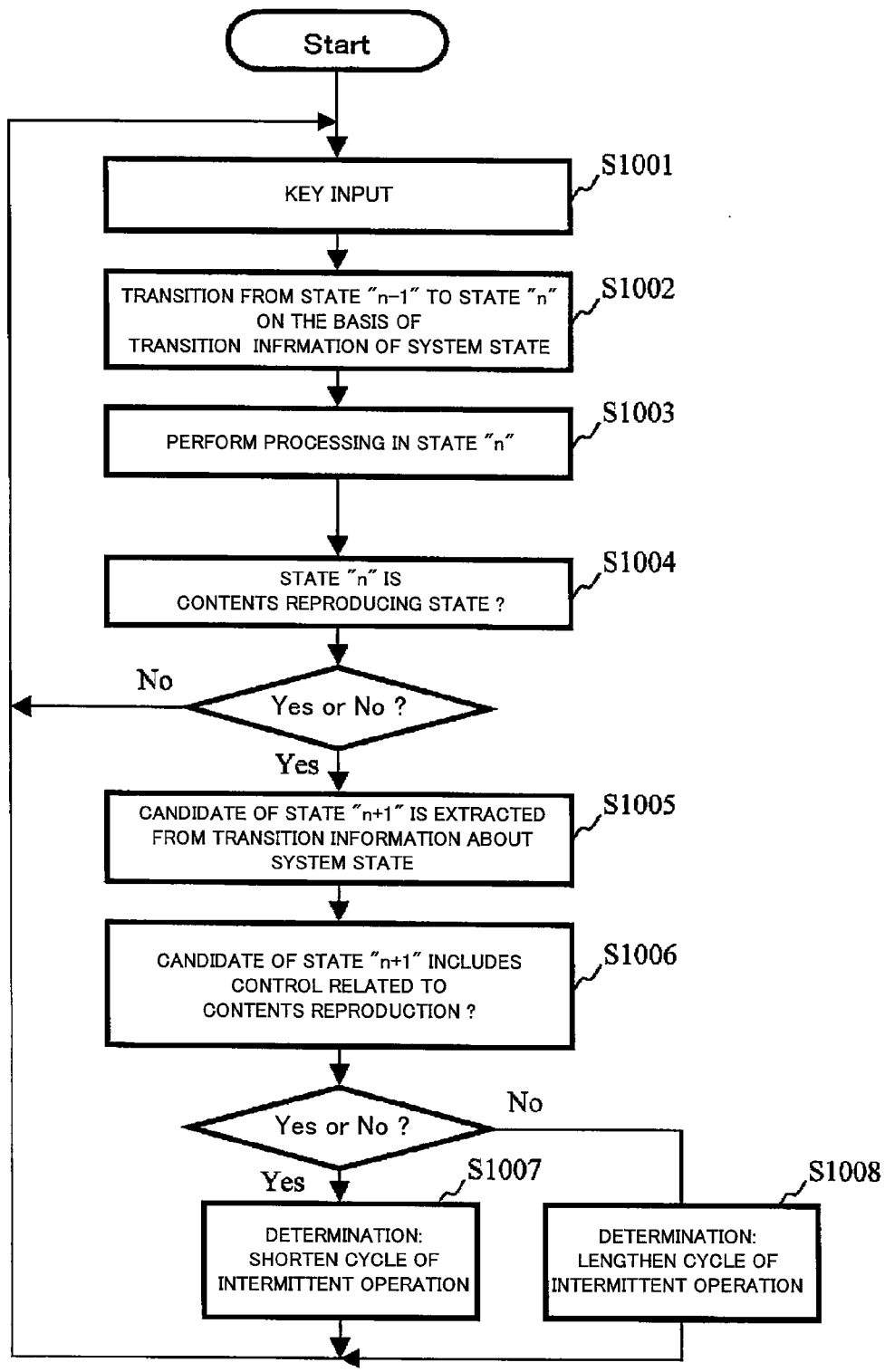
FIG. 5 is a control flow chart showing the contents reproducing device according to the second embodiment of the present invention.
Figure 6:
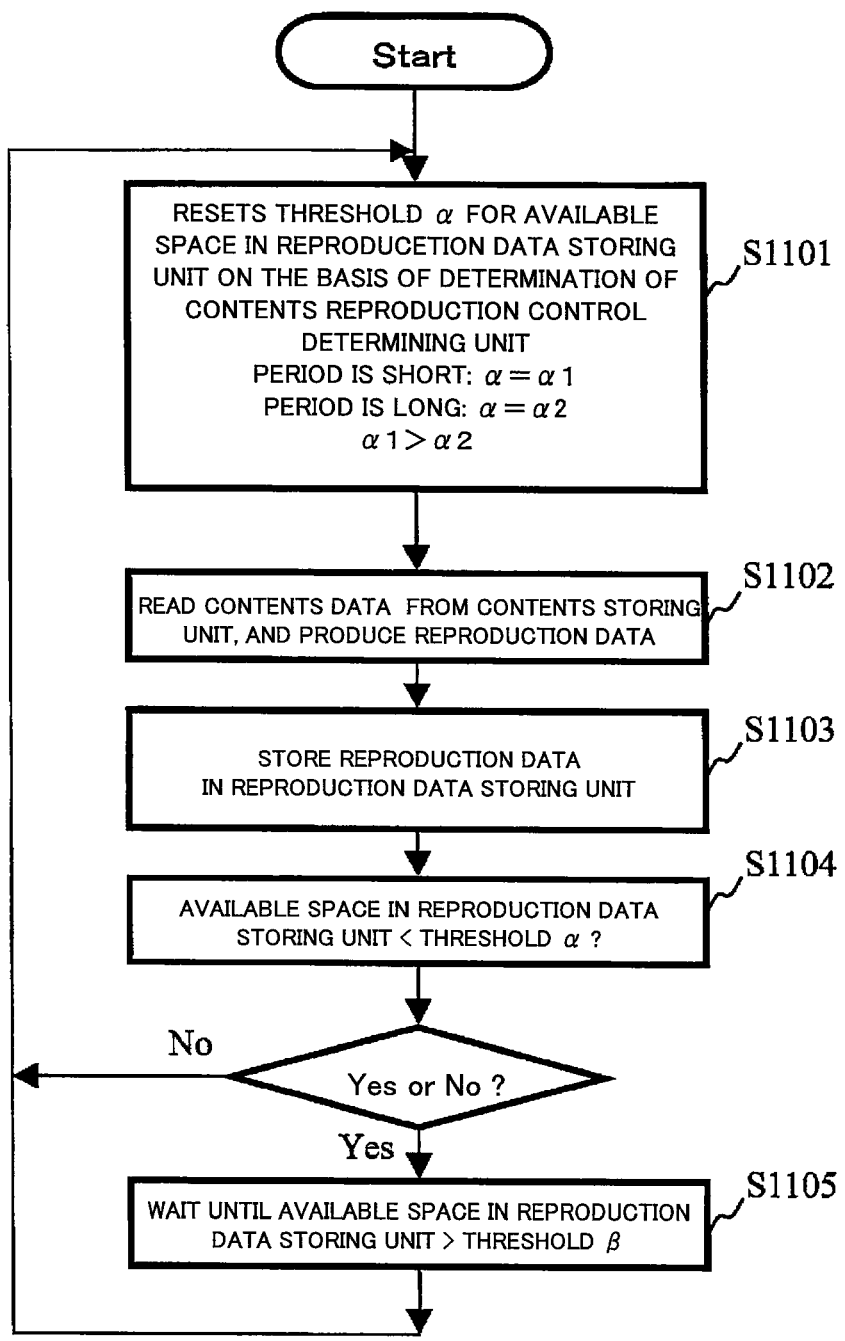
FIG. 6 is a control flow chart showing the contents reproducing device according to the second embodiment of the present invention.

FIGS. 5 and 6 are flow charts showing a content reproducing processing to be performed by the contents reproducing device according to the second embodiment. The operation of the contents reproducing device shown in FIG. 4 will be explained hereinafter with reference to the flow charts of FIGS. 5 and 6.

FIG. 5 is a flow chart showing the operation of the input operation unit 1100 and a system control unit 1200 having a function to predict a user operation. The system control unit 1200 comprises a system state managing unit 1210, a system information storing unit 1220, a contents reproduction control unit (A) 1230, a state after next candidate extracting unit 1240, and a contents reproduction control determining unit 1250. The steps S1001 and S1003 are the same as those of the flow chart shown in FIG. 12, and will not described hereinafter. The state after next candidate extracting unit 1240 reads the next state "n" from the system state managing unit 1210, and proceeds to step S1001 when the next state "n" is not a contents playing state (determination result=No) (in step S1004). When, on the other hand, the next state "n" is in the content playing state (determination result=Yes), the state after next candidate extracting unit 1240 reads a system state transition information from the system information storing unit 1220, then extracts candidates of the state after next (defined as "n+1") from the information of the next state "n" and the system state transition information (in step S1005). The contents reproduction control determining unit 1250 determines whether or not a control related to the content reproduction is in candidates of the state after next (in step S1006), and notifies the contents reproduction control unit 1230 (A) to shorten the cycle of the intermittent operation if a control related to content reproduction exists (in step S1007). When, on the other hand, the control related to the content reproduction is not in candidate of the state after next "n+1", the contents reproduction control determining unit 1250 notify the contents reproduction control unit (A) 1230 to lengthen the cycle of the intermittent operation compared to that the unit 1250 notified in S1007 (in step S1008).

FIG. 6 is a control flow chart showing an operation of the contents reproducing unit 1300 including the reproduction data generating unit 1310, the contents storing unit 1330, and the reproduction data storing unit 1340. In other words, FIG. 6 is a flow chart showing the processing of the contents reproduction control unit (A) 1230. The steps S1102 and S1105 of this flow chart are the same as those of the flow chart shown in FIG. 12(*b*), will not described hereinafter. The contents reproduction control unit (A) 1230 resets the available memory threshold a of the reproduction data storing unit 1340, which is used in the step S1104, to α1 or α1 according to the cycle of the intermittent operation designated assigned by the contents reproduction control determining unit 1250 (in step S1101). Though not mentioned in FIGS. 12(*a*) or 12(*b*), the reproduction data processing unit 1320 reproduces the reproduction data continuously by constantly reading reproduction data from the reproduction data storing unit 1340.

Figure 7:
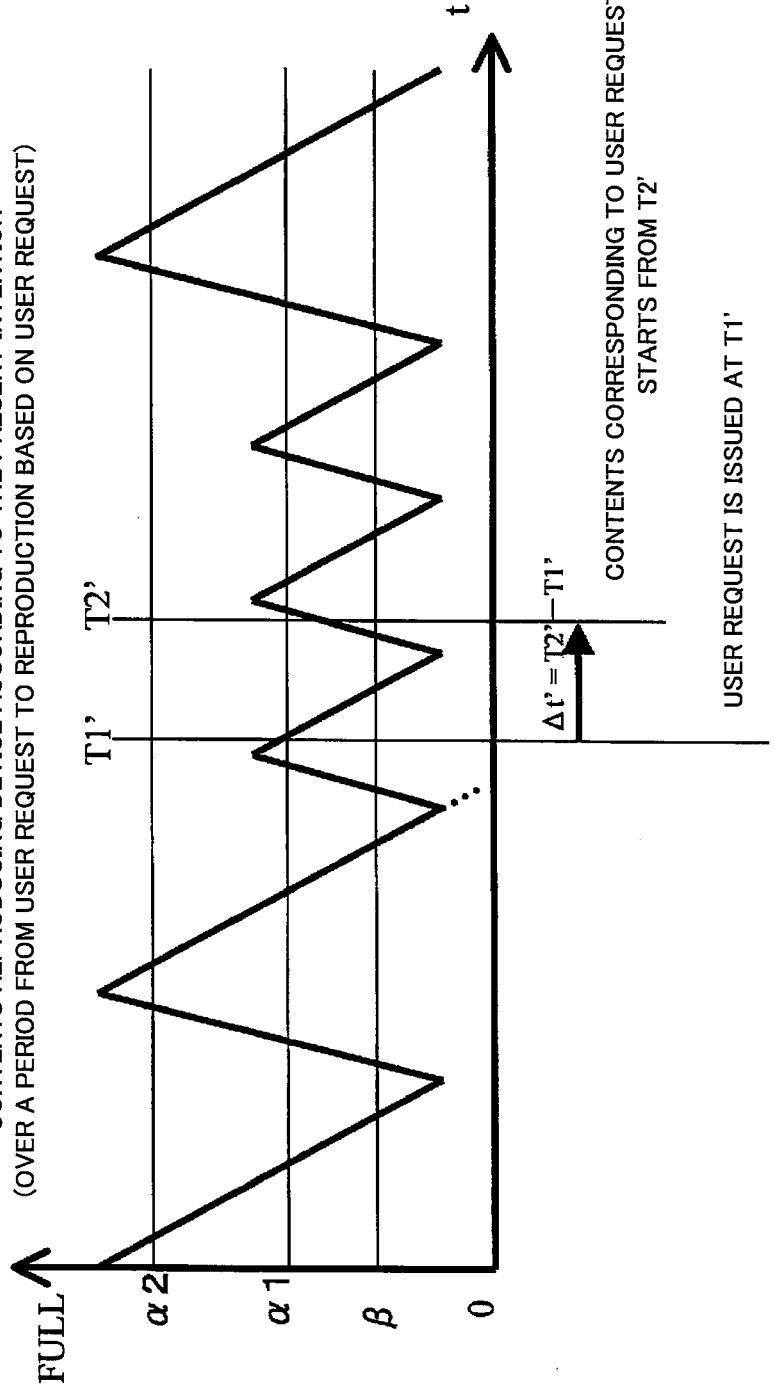
FIG. 7 is a timing diagram showing a change in the amount of data in the reproduction data storing unit of the contents reproducing device according to the second embodiment of the present invention.

A method of improving the problems raised in FIGS. 14(*a*) and 14(*b*) is described hereinafter with reference to FIGS. 7 and 8. In FIGS. 7(*a*) and 7(*b*), the labels α1, α2 and β on the vertical axis indicate the amount of reproduction data in the reproduction data storing unit 1340 when the available memory space in the reproduction data storing unit 1340 reaches the respective thresholds α1, α2 and β.

FIG. 7 is a timing chart for explaining the transition over time of the amount of data stored in the reproduction data storing unit 1340 when a user request occurs at time T1'. In this case, the contents reproducing device of this embodiment plays a content that do not correspond to the user request between time T1' and time T2' due to the fact that the reproduction data that have been stored up to the time T1' in the reproduction data storing unit 1340 is consumed until T2'. Therefore, the contents reproducing device cannot respond to the user request until T2'. Nevertheless, if at S1101, the detection threshold a for the memory available in the reproduction data storing unit 1340 is set to α1 (in step so that α1>α2 holds), the maximum memory storage of the reproduction data storing unit 1340 is reduced compared to the case in which the detection threshold α is set to α2. Therefore, this reduction of the maximum memory storage enables the contents reproducing device of this embodiment to improve, on the average, the user responsiveness relative to the conventional contents reproducing device.

Figure 8:
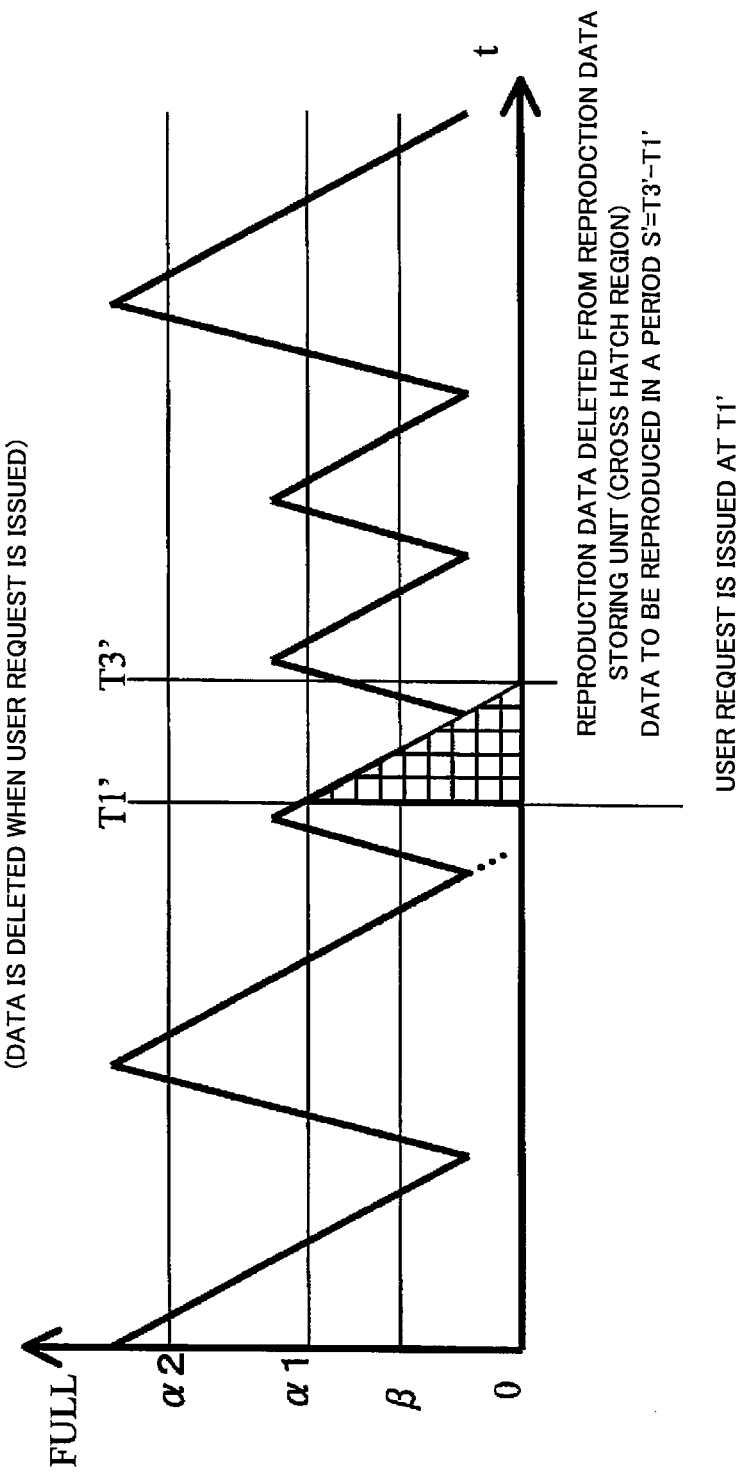
FIG. 8 is a timing diagram showing a change in the amount of data in the reproduction data storing unit of the contents reproducing device according to the second embodiment of the present invention.
Figure 13:
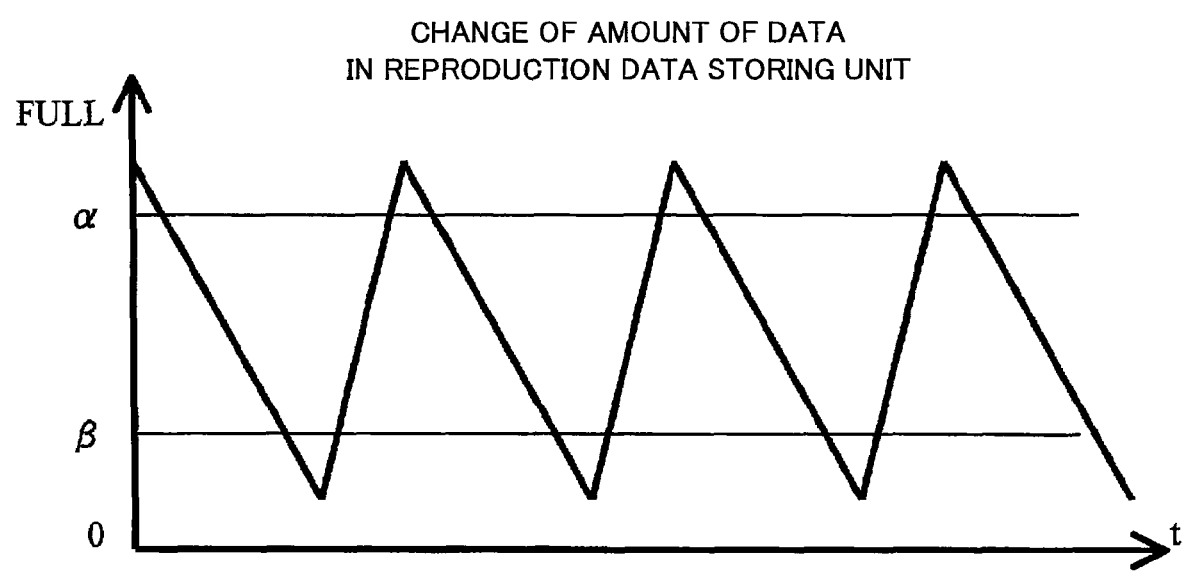
FIG. 13 is a first timing diagram showing a change in the amount of data in the reproduction data storing unit of the conventional contents reproducing device.

Moreover, FIG. 8(*b*) differs from FIG. 7(*a*) in that FIG. 8(*b*) is a timing chart for explaining the transition over time of the amount of data stored in case when the content that does not correspond to the user request is first deleted. Then, the content that does correspond to the user request is stored in the reproduction data storing unit 1340. In this case, the reproduction data which was previously planned to be played from the time T1' until the time T3' is deleted. Therefore, the power used to generate the data during this time interval (in step S' in FIG. 8) is wasted. However, if at S1101, the detection threshold a for the memory available in the reproduction data storing unit 1340 is set to α1 (in step so that α1>α2 holds), the maximum amount of the reproduction data that is to be deleted is reduced compared to the case in which the detection threshold α is set to α2. Therefore, this reduction of the maximum memory storage enables the contents reproducing device of this embodiment to reduce the average energy consumption relative to the conventional contents reproducing device.

FIG. 9(*a*) is a hierarchy diagram showing a hierarchical menu of the contents reproducing device. FIG. 9(*b*) is a diagram for explaining an operation necessary to extract candidate information on the state after next "n+1".

Each of "3-1-1) play", "3-1-2) fast forward", "3-1-3) rewind", and "3-1-4) equalizer" of the hierarchical menu shown in FIG. 9(*a*) contains a processing necessary to have the contents reproduction control unit 1230 control the contents reproducing unit 1300, while the hierarchical menu excluding the items listed above does not contain a processing necessary to have the contents reproduction control unit 1230 control the contents reproducing unit 1300.

In FIG. 9(*b*), a process A determines the next state "n" on the basis of the current state "n−1" and the user input information obtained by the input operation unit 1100. A process B extracts candidate information for the state after next "n+1" from the next state "n" and the system state transition information read from the system information storing unit 1220. The candidate information for the state after next "n+1" includes: "3-1-1) play", "3-1-2) fast forward", "3-1-3) rewind", and "3-1-4) equalizer", while "3-1-5) stop play" is excluded from this list. When "3-1) play" is selected as the next state "n", the contents reproduction control determining unit 1250 determines that "3-1) play" has candidate information for the state after next "n+1" having a control processing for having the contents reproduction control unit 1230 control the contents reproducing unit 1300, determines that there is a possibility that "3-1-1) play", "3-1-2) fast forward", "3-1-3) rewind", and "3-1-4) equalizer" are selected, and shortens the cycle of the intermittent operation of the contents reproducing unit 1300. When, on the other hand, the next state "n" is selected, the contents reproduction control determining unit 1250 determines that the next state "n" does not have candidate information for the state after next "n+1" having a control processing for having the contents reproduction control unit 1230 control the contents reproducing unit 1300, and lengthens the cycle of the intermittent operation of the contents reproducing unit 1300.

Alternatively, instead of controlling the cycle of the intermittent operation by resetting the threshold a of the reproduction data storing unit 1340 in this embodiment, the cycle of the intermittent operation may be controlled by using a timer as a part of the control by the contents reproduction control unit (A) 1230.

Moreover, the open-closed state information of the mobile terminal may also be used as the user input information to be taken by the input operation unit 1100.

INDUSTRIAL APPLICABILITY

The contents reproducing device according to the present invention is especially applicable to the audio player devices powered by a battery, or mobile phones having a function to reproduce audio and video contents.

The invention claimed is:

1. A contents reproducing device comprising:
   a reproduction data generating unit operable to generate reproduction data to be reproduced as contents;
   a reproduction data storing unit in which said reproduction data generated by said reproduction data generating unit is stored; and
   a reproduction data processing unit operable to read said reproduction data from said reproduction data storing unit in real time, and to reproduce said reproduction data read from said reproduction data storing unit, wherein
   said contents reproducing device further comprises:
   a reproduction data generation control unit operable to control said reproduction data generating unit to have said reproduction data generating unit perform an intermittent operation having a cycle time and a cycle start time by generating said reproduction data at a rate faster than a rate at which said reproduction data is read from said reproduction data storing unit;
   an input operation unit to be operated to have said contents reproducing device transit from one state to another state; and a system state determining unit operable to determine whether or not a state of said contents reproducing device resulting from the transition by the operation of said input operation unit has a possibility that a reproducing state of said reproduction data processing unit would be changed, said reproduction data generation control unit changes the cycle time or the cycle start time of said intermittent operation, when a state of said contents reproducing device has a possibility that a reproducing state of said reproduction data processing unit would be changed, before a reproducing state of said reproduction data processing unit is changed, while said reproduction data processing unit is reproducing said reproduction data.

2. A contents reproducing device according to claim 1, wherein
said reproduction data generation control unit reduces the cycle time of said intermittent operation when said system state determining unit determines that there is a possibility that said reproducing state of said reproduction data processing unit is changed, and the reduced cycle time of said intermittent operation to be performed under the condition that said system state determining unit determines that there is a possibility that said reproducing state of said reproduction data processing unit is changed is smaller than the cycle time of said intermittent operation to be performed under the condition that said system state determining unit determines that there is no possibility that said reproducing state of said reproduction data processing unit is changed.

3. A contents reproducing device according to claim 1, wherein
said reproduction data generation control unit increases the cycle time of said intermittent operation when said system state determining unit determines that there is no possibility that said reproducing state of said reproduction data processing unit is changed, and the increased cycle time of said intermittent operation to be performed under the condition that said system state determining unit determines that there is no possibility that said reproducing state of said reproduction data processing unit is changed is larger than the cycle time of said intermittent operation to be performed under the condition that said system state determining unit determines that there is a possibility that said reproducing state of said reproduction data processing unit is changed.

4. A contents reproducing device of according to claim 3, wherein
said reproduction data generation control unit increases the cycle time of said intermittent operation when said system state determining unit does not determine, in a predetermined period of time, that there is a possibility that said reproducing state of said reproduction data processing unit is changed, after determining that there is no possibility that said reproducing state of said reproduction data processing unit is changed when said input operation unit is operated.

5. A contents reproducing device according to claim 1, wherein
said reproduction data generation control unit changes said cycle of said intermittent operation by adjusting the amount of reproduction data to be generated by said reproduction data generating unit over an active stage of said intermittent operation.

6. A contents reproducing device according to claim 1, wherein
said reproduction data generation control unit has a timer, and changes said cycle of said intermittent operation by adjusting a period of an active stage of said intermittent operation by using said timer.

7. A contents reproducing device according to claim 1, wherein
said reproduction data generation control unit changes said cycle of said intermittent operation by adjusting a threshold with which the amount of reproduction data in said reproduction data storing unit is limited.

8. A contents reproducing device according to claim 1, further comprising:
a clock/power source control unit operable to control a clock signal and/or a power source to be provided to said reproduction data processing unit when said reproduction data generating unit is in an inactive stage of said intermittent operation.

9. A contents reproducing device comprising:
a reproduction data generating unit operable to generate reproduction data to be reproduced as contents;
a reproduction data storing unit in which said reproduction data generated by said reproduction data generating unit is stored; and
a reproduction data processing unit operable to read said reproduction data from said reproduction data storing unit in real time, and to reproduce said reproduction data read from said reproduction data storing unit, wherein
said contents reproducing device further comprises:
a reproduction data generation control unit operable to control said reproduction data generating unit to have said reproduction data generating unit perform an intermittent operation having a cycle start time by generating said reproduction data at a rate faster than a rate at which said reproduction data is read from said reproduction data storing unit;
an input operation unit to be operated to have said contents reproducing device transit from one state to another state; and
a system state determining unit operable to determine whether or not a state of said contents reproducing device resulting from the transition by the operation of said input operation unit has a possibility that a reproducing state of said reproduction data processing unit would be changed,
said reproduction data generation control unit changes the cycle start time of said intermittent operation, when a state of said contents reproducing device has a possibility that a reproducing state of said reproduction data processing unit would be changed, before a reproducing state of said reproduction data processing unit is changed, while said reproduction data processing unit is reproducing said reproduction data.

10. A contents reproducing device comprising:
a reproduction data generating unit that generates reproduction data to be reproduced as contents;
a reproduction data storing unit in which said reproduction data generated by said reproduction data generating unit is stored; and
a reproduction data processing unit that reads said reproduction data from said reproduction data storing unit in real time, and to reproduce said reproduction data read from said reproduction data storing unit, wherein said contents reproducing device further comprises:
a reproduction data generation control unit that controls said reproduction data generating unit to perform an intermittent operation having a cycle time and a cycle start time by generating said reproduction data at a rate faster than a rate at which said reproduction data is read from said reproduction data storing unit;
an input operation unit that receives a user operation, upon receiving the user operation, said contents reproducing device takes either a stable state in which changing a reproducing state of the reproduction data processing unit is not possible, or a predictive state in which changing a reproducing state of the reproduction data processing unit is possible; and
a system state determining unit that determines whether the contents reproducing device is in the stable state or in the predictive state,
said reproduction data generation control unit changes the cycle time or the cycle start time of said intermittent operation, when a state of said contents reproducing device is in the predictive state, before a reproducing state of said reproduction data processing unit is changed, while said reproduction data processing unit is reproducing said reproduction data.

11. A contents reproducing device according to claim 10, wherein
the cycle time of said intermittent operation in the stable state is longer than that of in the predictive state.

12. A contents reproducing device according to claim 10, wherein
the cycle time of said intermittent operation is changed after the stable state is maintained for a predetermined period of time.

* * * * *